(12) United States Patent
Suk

(10) Patent No.: US 10,759,375 B2
(45) Date of Patent: Sep. 1, 2020

(54) SIDE AIRBAG APPARATUS AND METHOD OF MANUFACTURING THE SAME

(71) Applicant: HYUNDAI MOBIS CO., LTD., Seoul (KR)

(72) Inventor: Dong Su Suk, Suwon-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 115 days.

(21) Appl. No.: 16/129,071

(22) Filed: Sep. 12, 2018

(65) Prior Publication Data

US 2019/0084520 A1    Mar. 21, 2019

(30) Foreign Application Priority Data

Sep. 19, 2017    (KR) .................... 10-2017-0120705

(51) Int. Cl.
| | |
|---|---|
| *B60R 21/207* | (2006.01) |
| *B60R 21/231* | (2011.01) |
| *B60R 21/237* | (2006.01) |
| *B60R 21/235* | (2006.01) |
| *B60R 21/00* | (2006.01) |

(52) U.S. Cl.
CPC ...... *B60R 21/23138* (2013.01); *B60R 21/207* (2013.01); *B60R 21/237* (2013.01); *B60R 2021/0006* (2013.01); *B60R 2021/0044* (2013.01); *B60R 2021/23107* (2013.01); *B60R 2021/23146* (2013.01); *B60R 2021/23538* (2013.01)

(58) Field of Classification Search
CPC ............ B60R 21/23138; B60R 21/207; B60R 2021/23146
See application file for complete search history.

(56) References Cited

U.S. PATENT DOCUMENTS

| | | | | |
|---|---|---|---|---|
| 5,647,609 | A * | 7/1997 | Spencer | ................ B60R 21/207 |
| | | | | 280/730.1 |
| 7,350,811 | B2 * | 4/2008 | Sato | ................... B60R 21/23138 |
| | | | | 280/730.1 |
| 9,145,102 | B2 * | 9/2015 | Fujiwara | ................ B60R 21/231 |
| 9,227,590 | B2 * | 1/2016 | Fujiwara | ........... B60R 21/23138 |
| 9,505,369 | B2 * | 11/2016 | Iida | ..................... B60R 21/2338 |

(Continued)

FOREIGN PATENT DOCUMENTS

WO    WO-2010122959 A1 * 10/2010 ....... B60R 21/23138

*Primary Examiner* — Nicole T Verley
(74) *Attorney, Agent, or Firm* — Knobbe Martens Olson & Bear LLP

(57) ABSTRACT

Disclosed herein may be a side airbag apparatus and a method of manufacturing the same. The side airbag apparatus may include: an outboard sheet part disposed on a side portion of a vehicle body; an inboard sheet part laminated to an interior side of the outboard sheet part and formed such that a first peripheral part located on an opposite side of a gas injecting part is longer than a second peripheral part located adjacent to the gas injecting part; a push chamber formed such that a folding length of the first peripheral part is longer than that of the second peripheral part; a folding seam part seaming a folded part of the first peripheral part; and a peripheral seam part seaming a peripheral part of the outboard sheet part, a peripheral part of the inboard sheet part, and the first peripheral part of the push chamber all together.

8 Claims, 11 Drawing Sheets

(56) References Cited

U.S. PATENT DOCUMENTS

| | | | | |
|---|---|---|---|---|
| 9,776,593 | B2* | 10/2017 | Je | B60R 21/232 |
| 9,873,399 | B2* | 1/2018 | Goto | B60R 21/231 |
| 10,106,119 | B2* | 10/2018 | Oh | B60R 21/21 |
| 2006/0131847 | A1* | 6/2006 | Sato | B60R 21/207 |
| | | | | 280/730.2 |
| 2019/0001916 | A1* | 1/2019 | Jo | B60R 21/23138 |

* cited by examiner

SIDE AIRBAG APPARATUS AND METHOD OF MANUFACTURING THE SAME

CROSS-REFERENCES TO RELATED APPLICATIONS

The present application claims priority to Korean application number 10-2017-0120705, filed on Sep. 19, 2017, which is incorporated by reference in its entirety.

BACKGROUND OF THE INVENTION

The present invention relates to a side airbag apparatus and a method of manufacturing the side airbag apparatus, and more particularly, to a side airbag apparatus capable of preventing the chest from being injured by the inflation pressure of a shock absorbing chamber when a vehicle is involved in a side collision, and a method of manufacturing the side airbag apparatus.

In general, airbags are installed in a vehicle so as to protect occupants. The airbags are disposed at various locations depending on an occupant's body regions to be protected. A side airbag is disposed on an outer side of a seat.

When the vehicle is involved in a side collision, gas is injected into the side airbag. As the side airbag is inflated by the gas, an outer side of the occupant is protected while shocks are absorbed.

In various countries, a dummy model to be tested may be changed according to regulations related to a collision test. If the dummy model is changed such that the arms of the dummy model are at a lower location, the arms of the dummy model are positioned to be almost parallel to the torso. As the arms are positioned to be parallel to the torso, a gap between a side portion of a vehicle body and the arm is reduced. In this case, if the side airbag is inflated, the arm is caught between the side airbag and the torso, so that the arm presses the chest by the inflation pressure of the side airbag. Therefore, the occupant's chest may be injured by the inflation pressure of the side airbag.

SUMMARY OF THE INVENTION

Embodiments of the present invention are directed to a side airbag apparatus capable of preventing the chest from being injured by the inflation pressure of a shock absorbing chamber in the event of the side-on collision of a vehicle, and a method of manufacturing the side airbag apparatus.

In one embodiment, a side airbag apparatus may include: a side airbag apparatus, including an outboard sheet part disposed on a side portion of a vehicle body; an inboard sheet part laminated to an interior side of the outboard sheet part, and formed such that a first peripheral part located on an opposite side of a gas injecting part is longer than a second peripheral part located adjacent to the gas injecting part; a push chamber formed such that a folding length of the first peripheral part is longer than that of the second peripheral part, the push chamber being inflated and protruded to the interior side to push up an occupant's arm as gas is injected; a folding seam part seaming a folded part of the first peripheral part in a state where the push chamber is folded; and a peripheral seam part seaming a peripheral part of the outboard sheet part, a peripheral part of the inboard sheet part, and the first peripheral part of the push chamber all together, after the push chamber is seamed.

The push chamber may be folded such that a side around the first peripheral part may be wide and a side around the second peripheral part may be narrow.

The push chamber may be folded in a triangular shape.

The push chamber may be disposed to face the gas injecting part.

In another embodiment, a method of manufacturing a side airbag apparatus may include forming an inboard sheet part such that a length of a first peripheral part located on an opposite side of a gas injecting part is longer than that of a second peripheral part located adjacent to the gas injecting part; folding a push chamber such that a folding length of the first peripheral part is longer than that of the second peripheral part; seaming the folded first peripheral part of the push chamber to form a folding seam part; laminating the inboard sheet part to the outboard sheet part, after the push chamber is seamed; and seaming, after the push chamber is seamed, a peripheral part of the outboard sheet part, a peripheral part of the inboard sheet part, and the first peripheral part of the push chamber all together to form a peripheral seam part.

The push chamber may be folded such that a side around the first peripheral part may be wide and a side around the second peripheral part may be narrow.

The push chamber may be folded in a triangular shape.

The push chamber may be disposed to face the gas injecting part.

DESCRIPTION OF SPECIFIC EMBODIMENTS

Hereafter, a side airbag apparatus and a method of manufacturing the side airbag apparatus in accordance with embodiments of the invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
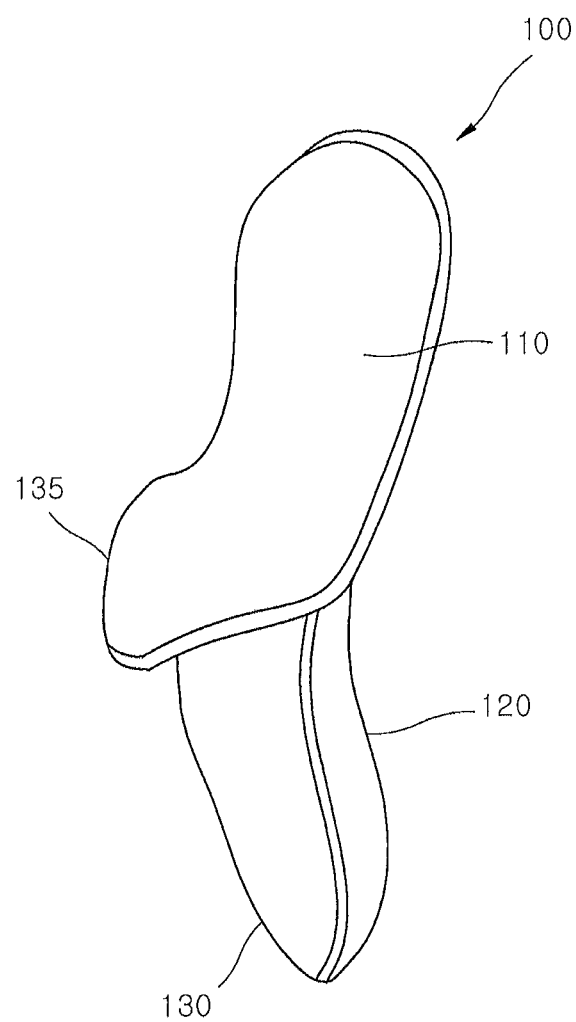
FIG. 1 is a front diagram illustrating the front of a side airbag apparatus in accordance with an embodiment of the present invention.
Figure 2:
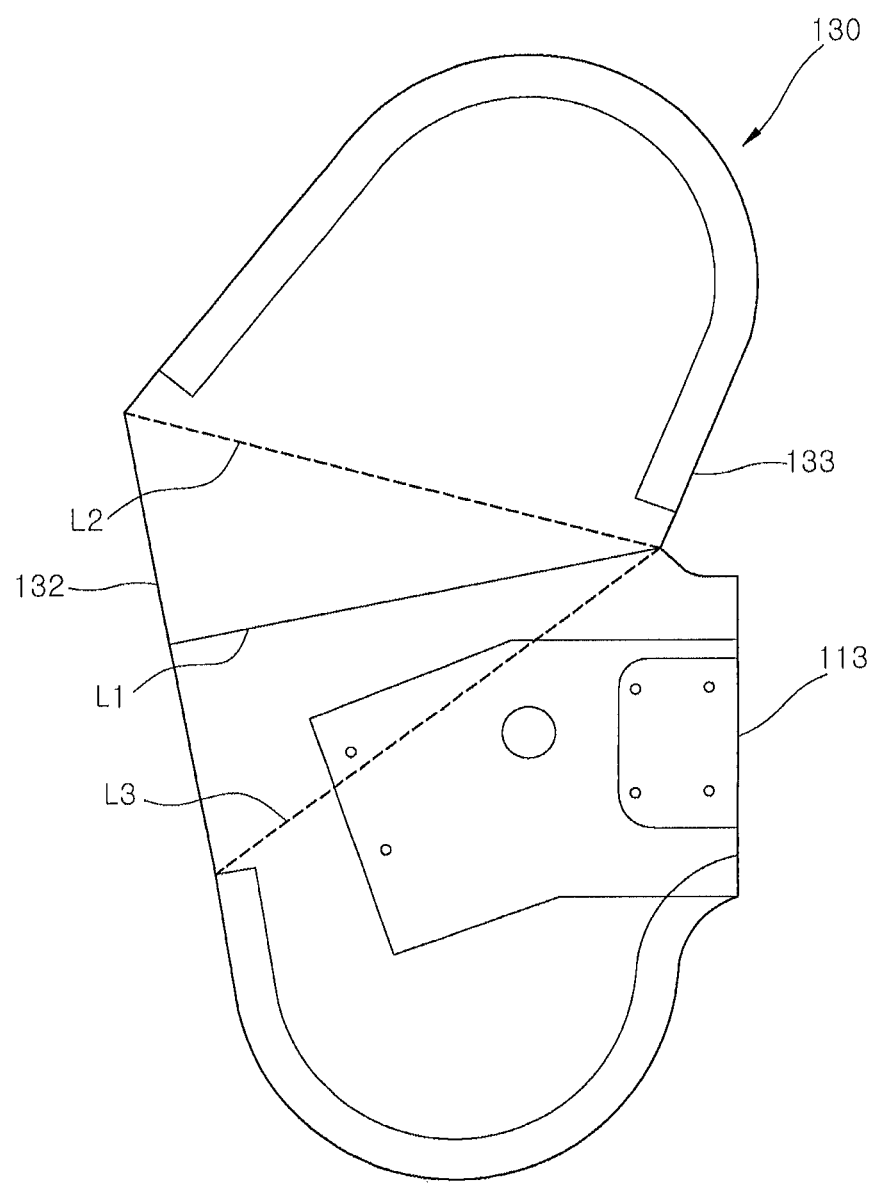
FIG. 2 is a development diagram illustrating an unfolded state of an inboard sheet part in the side airbag apparatus in accordance with the embodiment of the present invention.
Figure 3:
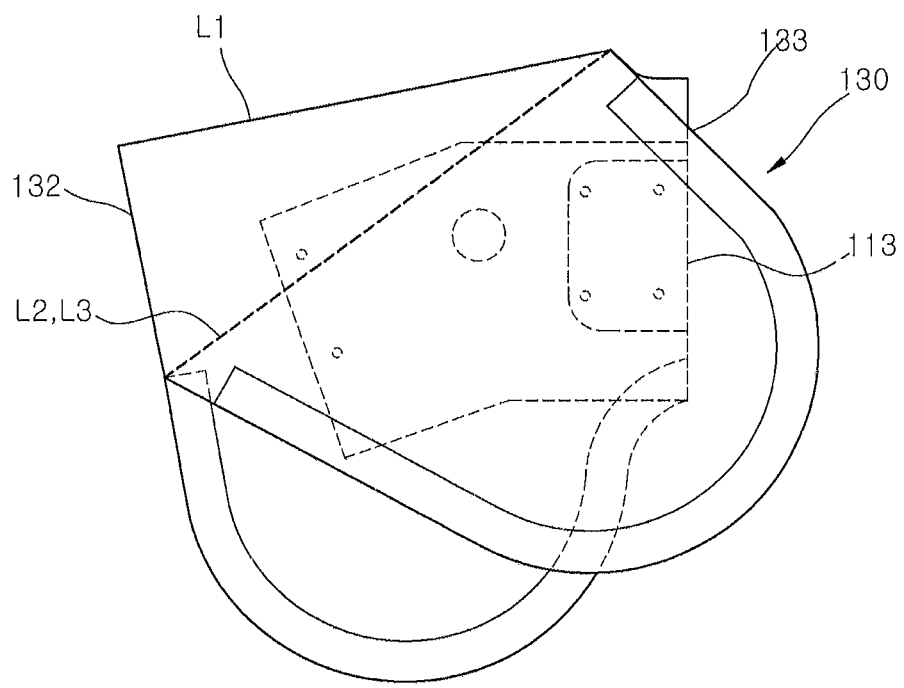
FIG. 3 is a plan diagram illustrating a state where the inboard sheet part in the side airbag apparatus in accordance with the embodiment of the present invention is folded on a first folding line.
Figure 4:
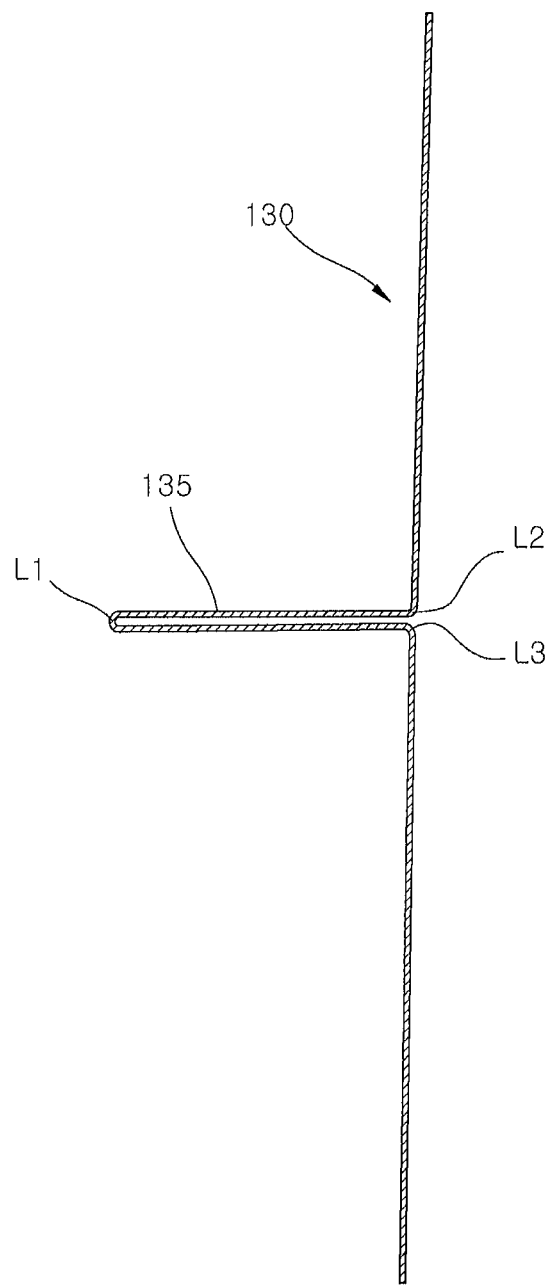
FIG. 4 is a sectional diagram illustrating the state where the inboard sheet part in the side airbag apparatus in accordance with the embodiment of the present invention is folded on the first folding line.
Figure 5:
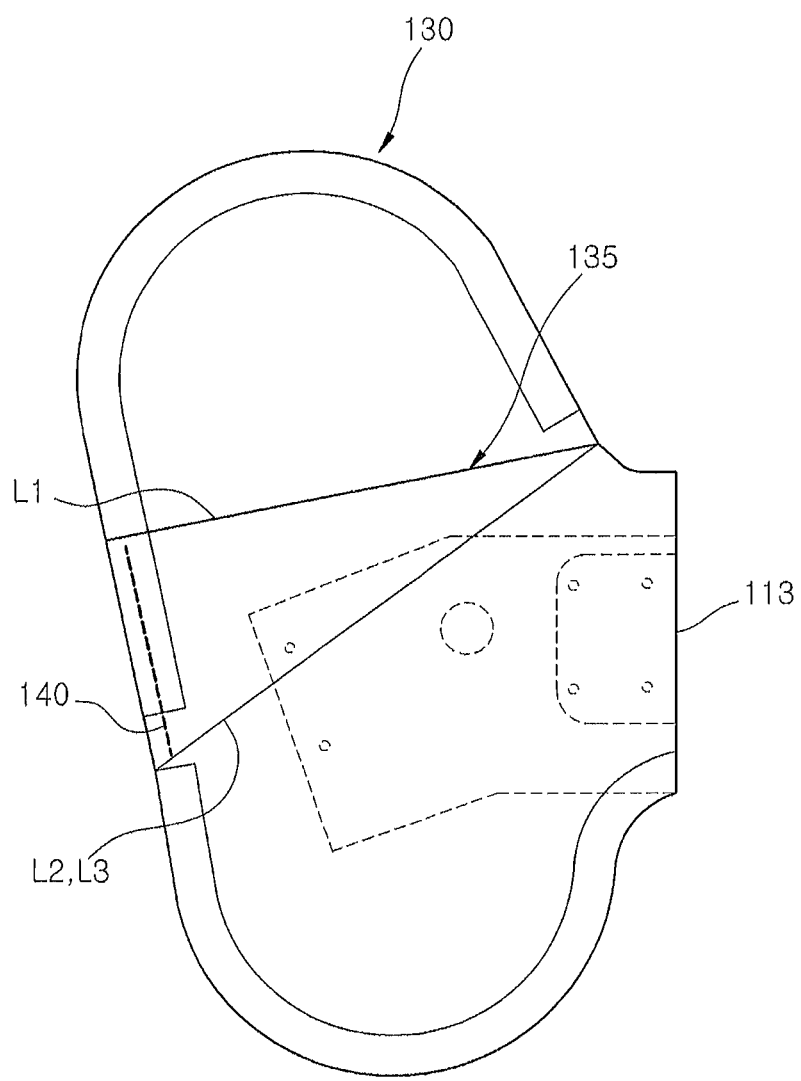
FIG. 5 is a plan diagram illustrating a state where the inboard sheet part in the side airbag apparatus in accordance with the embodiment of the present invention is folded on a second folding line in an opposite direction.
Figure 6:
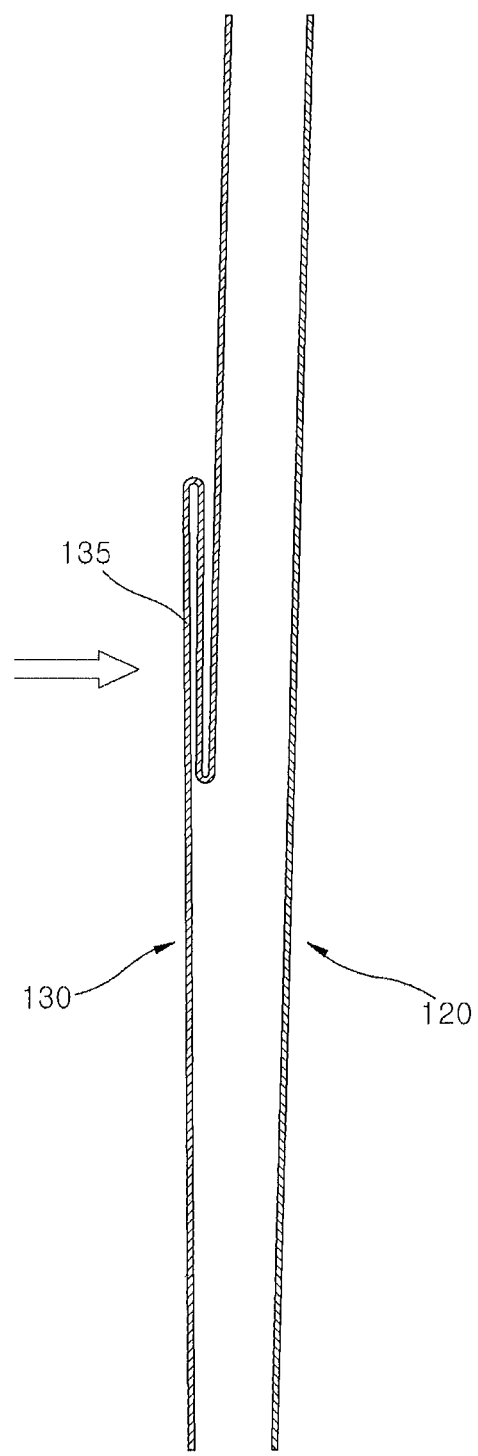
FIG. 6 is a sectional diagram illustrating a state where the inboard sheet part is laminated to an outboard sheet part in the side airbag apparatus in accordance with the embodiment of the present invention.
Figure 7:
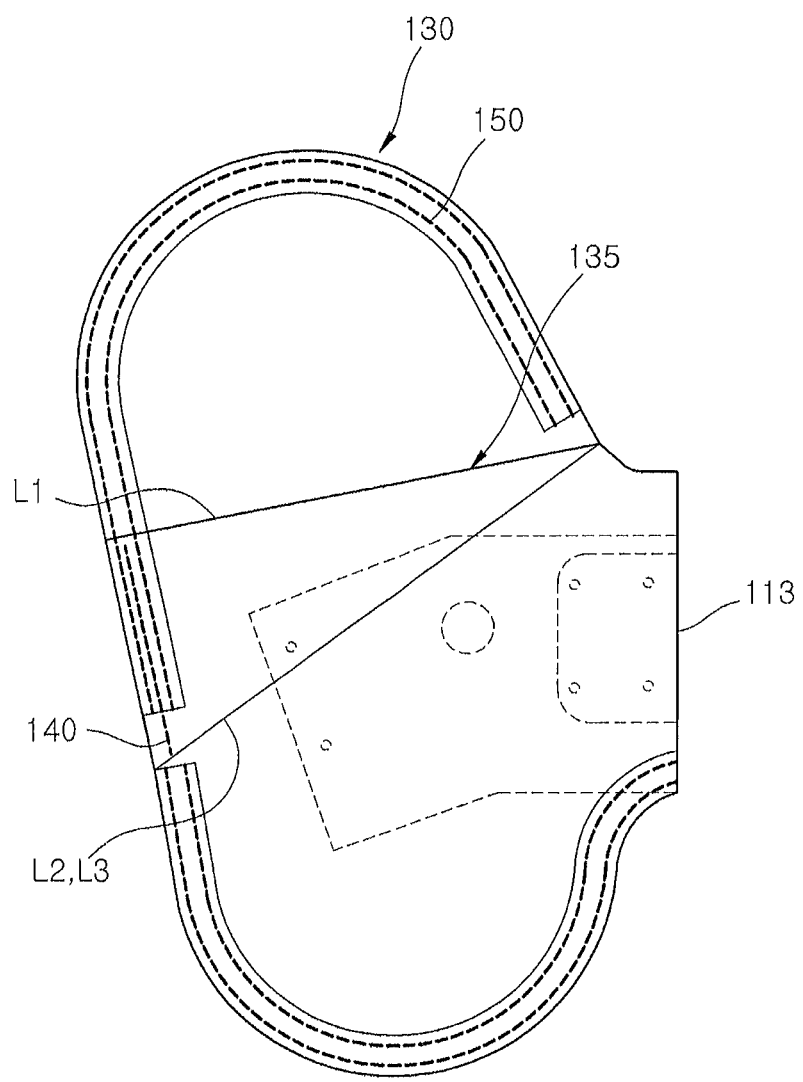
FIG. 7 is a plan diagram illustrating a state where the inboard sheet part and the outboard sheet part are seamed by a peripheral seam part in the side airbag apparatus in accordance with the embodiment of the present invention.
Figure 8:
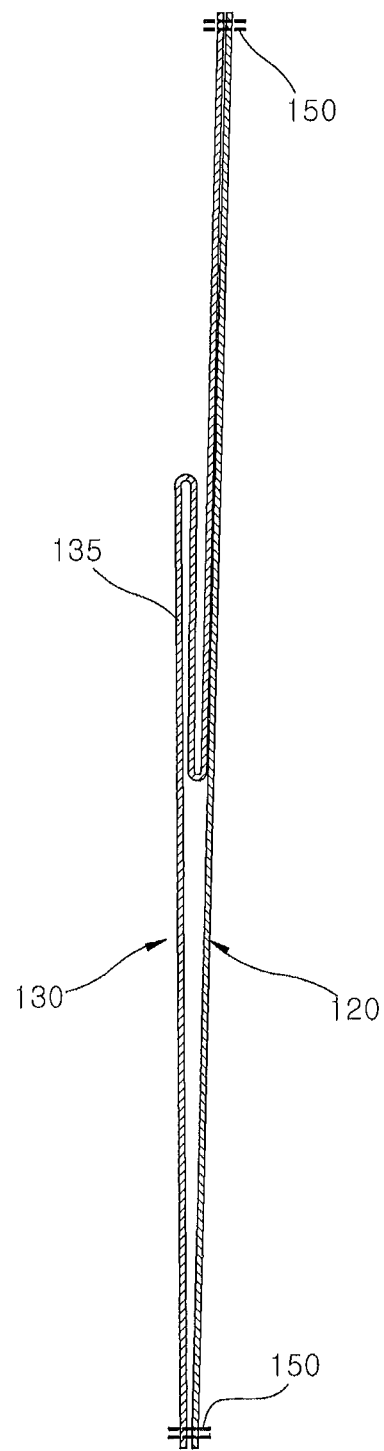
FIG. 8 is a sectional diagram illustrating the state where the inboard sheet part and the outboard sheet part are seamed by the peripheral seam part in the side airbag apparatus in accordance with the embodiment of the present invention.

FIG. 1 is a front diagram illustrating the front of a side airbag apparatus in accordance with an embodiment of the present invention, FIG. 2 is a development diagram illustrating an unfolded state of an inboard sheet part in the side airbag apparatus in accordance with the embodiment of the present invention, FIG. 3 is a plan diagram illustrating a state where the inboard sheet part in the side airbag apparatus in accordance with the embodiment of the present invention is folded on a first folding line, FIG. 4 is a sectional diagram illustrating the state where the inboard sheet part in the side airbag apparatus in accordance with the embodiment of the present invention is folded on the first folding line, FIG. 5 is a plan diagram illustrating a state where the inboard sheet part in the side airbag apparatus in accordance with the embodiment of the present invention is folded on a second folding line in an opposite direction, FIG. 6 is a sectional diagram illustrating a state where the inboard sheet part is laminated to an outboard sheet part in the side airbag apparatus in accordance with the embodiment of the present invention, FIG. 7 is a plan diagram illustrating a state where the inboard sheet part and the outboard sheet part are seamed by a peripheral seam part in the side airbag apparatus in accordance with the embodiment of the present invention and FIG. 8 is a sectional diagram illustrating the state where the inboard sheet part and the outboard sheet part are seamed by the peripheral seam part in the side airbag apparatus in accordance with the embodiment of the present invention.

As illustrated in FIGS. 1 to 8, the side airbag apparatus 100 in accordance with the embodiment of the present invention includes an outboard sheet part 120, an inboard sheet part 130, a push chamber 135, a folding seam part 140, and a peripheral seam part 150.

The side airbag apparatus 100 is provided on an outer side (outboard side) of a seat 10 (see FIG. 9) on which an occupant sits. A shock absorbing chamber 110 of the side airbag apparatus 100 is inflated to cover an occupant's torso 21 (see FIG. 9) sitting on the seat 10.

The outboard sheet part 120 is disposed on a side portion of a vehicle body (not shown). The outboard sheet part 120 may be generally formed in an elliptical shape. The outboard sheet part 120 may be made of synthetic fiber material.

The inboard sheet part 130 is laminated to an inner side of the outboard sheet part 120, that is, an interior side of the vehicle. Here, a first peripheral part 132 located on an opposite side of a gas injecting part 113 is formed to be longer than a second peripheral part 133 located adjacent to the gas injecting part 113.

The inboard sheet part 130 defines the shock absorbing chamber 110 along with the outboard sheet part 120. The gas injecting part 113 is formed on a rear side of the shock absorbing chamber 110. The inboard sheet part 130 and the outboard sheet part 120 form the elliptical shock absorbing chamber 110 as gas is injected through the gas injecting part 113. The outboard sheet part 120 may be made of synthetic fiber material.

The push chamber 135 is formed such that the first peripheral part 132 is longer in folding length than the second peripheral part 133, and is inflated and protruded to the interior side to push up the occupant's arm 23 as the gas is injected. In the side airbag apparatus, the first peripheral part 132 faces a front side, while the second peripheral part 133 faces a rear side.

Since the push chamber 135 pushes up the occupant's arm 23 during the inflation of the push chamber 135, a space is increased on a side of the occupant by the thickness of the arm 23. Therefore, since a sufficient space for allowing the shock absorbing chamber 110 to be inflated in a thickness direction is provided outside the occupant's torso 21, the inflation pressure of the shock absorbing chamber 110 acting on the occupant's torso 21 or chest may be relatively reduced. Moreover, it is possible to prevent the occupant's chest from being injured by the inflation pressure of the shock absorbing chamber 110.

Furthermore, since the space is increased on a side of the occupant by the thickness of the arm 23, the shock absorbing chamber 110 may be formed to be relatively thicker. Therefore, it is possible to improve the stability of the occupant.

Furthermore, since the arm 23 is pushed up forwards by the push chamber 135, a space for deploying the shock absorbing chamber 110 is sufficiently provided on a side of the occupant. Therefore, the shock absorbing chamber 110 may be deployed while being stably located on a side of the occupant, without being interfered by the arm 23.

The arm 23 is divided into an upper arm and a lower arm on the basis of an elbow. Hereinafter, the upper arm will be referred to as the arm 23.

The folding seam part 140 seams a folded part of the first peripheral part 132 in a state where the push chamber 135 is folded. Therefore, a folding process of the push chamber 135 in the inboard sheet part 130 is completed.

The push chamber 135 is folded such that a side (left side of FIG. 3) around the first peripheral part 132 is wide, while a side (right side of FIG. 3) around the second peripheral part 133 is narrow. For example, the push chamber 135 is folded in a triangular shape. Here, one vertex of the push chamber 135 faces rearwards. Since the push chamber 135 is formed such that the side around the first peripheral part 132 is wide and a side around the second peripheral part 133 is narrow, a front side of the push chamber 135 is thicker than a rear side thereof at the time of being inflated.

In the push chamber 135, the first peripheral part 132 is longer in folding length than the second peripheral part 133, and the first peripheral part 132 of the push chamber 135 is seamed by the folding seam part 140. Thus, the push chamber 135 may be convexly inflated to the interior side in the shock absorbing chamber 110 to press the rear side of the arm 23.

The push chamber 135 is disposed to face the gas injecting part 113. Therefore, since gas injected into the gas injecting part 113 is more rapidly injected into the push chamber 135, the deployment speed of the push chamber 135 may be increased. Such a position of the push chamber 135 may be appropriately changed depending on the size and installation height of the push chamber 135.

After the push chamber 135 is seamed, the peripheral part of the outboard sheet part 120, the peripheral part of the inboard sheet part 130, and the first peripheral part 132 of the push chamber 135 are seamed together by the peripheral seam part 150. Therefore, the perimeter of the side airbag apparatus 100 is sealed by the peripheral seam part 150.

Next, a method of manufacturing a side airbag in accordance with an embodiment of the present invention will be described.

The inboard sheet part 130 is formed such that a length of the first peripheral part 132 located on an opposite side of the gas injecting part 113 is longer than that of the second peripheral part 133 located adjacent to the gas injecting part 133.

A first folding line L1 is drawn on a central part of the inboard sheet part 130 or a surrounding part thereof, and a second folding line L2 and a third folding line L3 are drawn on parts above and below the first folding line L1, respectively. The first folding line L1, the second folding line L2, and the third folding line L3 may be imaginary lines or lines that are drawn actually. The second folding line L2 and the third folding line L3 converge on the second peripheral part 133, and the first folding line L1 is disposed on a central part between the second folding line L2 and the third folding line L3.

The push chamber 135 is folded such that the folding length of the first peripheral part 132 in the inboard sheet part 130 is longer than the folding length of the second peripheral part 133. Here, if the inboard sheet part 130 is folded to one side on the first folding line L1, the second folding line L2 and the third folding line L3 are aligned with each other.

The folded first peripheral part 132 of the push chamber 135 is seamed to form the folding seam part 140. That is, a section between the first folding line L1 and the second folding line L2 (or third folding line L3) in the first peripheral part 132 of the inboard sheet part 130 is seamed to form the folding seam part 140. The inboard sheet part 130 is folded to the other side on the second folding line L2, so that the folding process of the push chamber 135 is completed.

Here, the push chamber 135 is folded such that a side around the first peripheral part 132 is wide and a side around the second peripheral part 133 is narrow. For example, the push chamber 135 is folded in the triangular shape.

The push chamber 135 is disposed to face the gas injecting part 113. Therefore, since the gas injected into the gas injecting part 113 is more rapidly injected into the push chamber 135, the push chamber 135 may be more rapidly deployed.

After the push chamber 135 is seamed, the inboard sheet part 130 is laminated to the outboard sheet part 120.

The peripheral part of the outboard sheet part 120, the peripheral part of the inboard sheet part 130, and the first peripheral part 132 of the push chamber 135 are seamed all together, thus forming the peripheral seam part 150.

The operation of the side airbag apparatus in accordance with the embodiment of the present invention configured as described above will be described.

Figure 9:
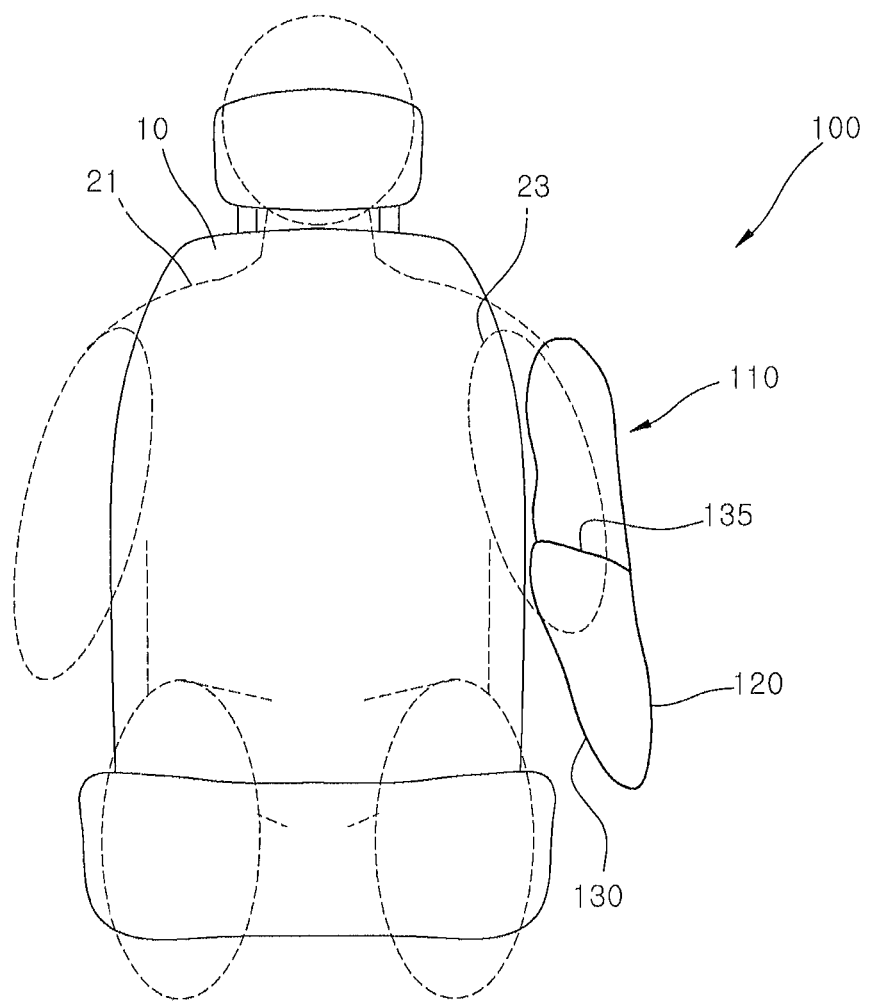
FIG. 9 is an operational diagram illustrating an initial state of deployment of the side airbag apparatus in accordance with the embodiment of the present invention.
Figure 10:
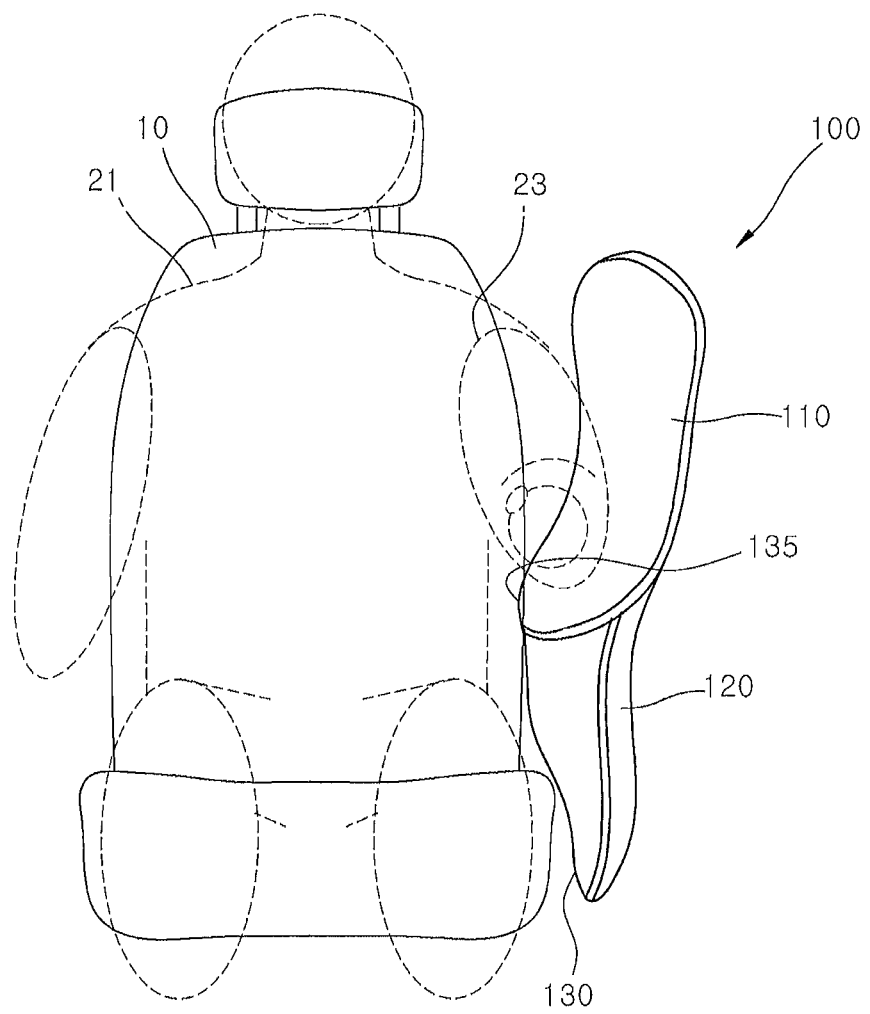
FIG. 10 is an operational diagram illustrating a state where a push chamber of the side airbag apparatus in accordance with the embodiment of the present invention is deployed.
Figure 11:
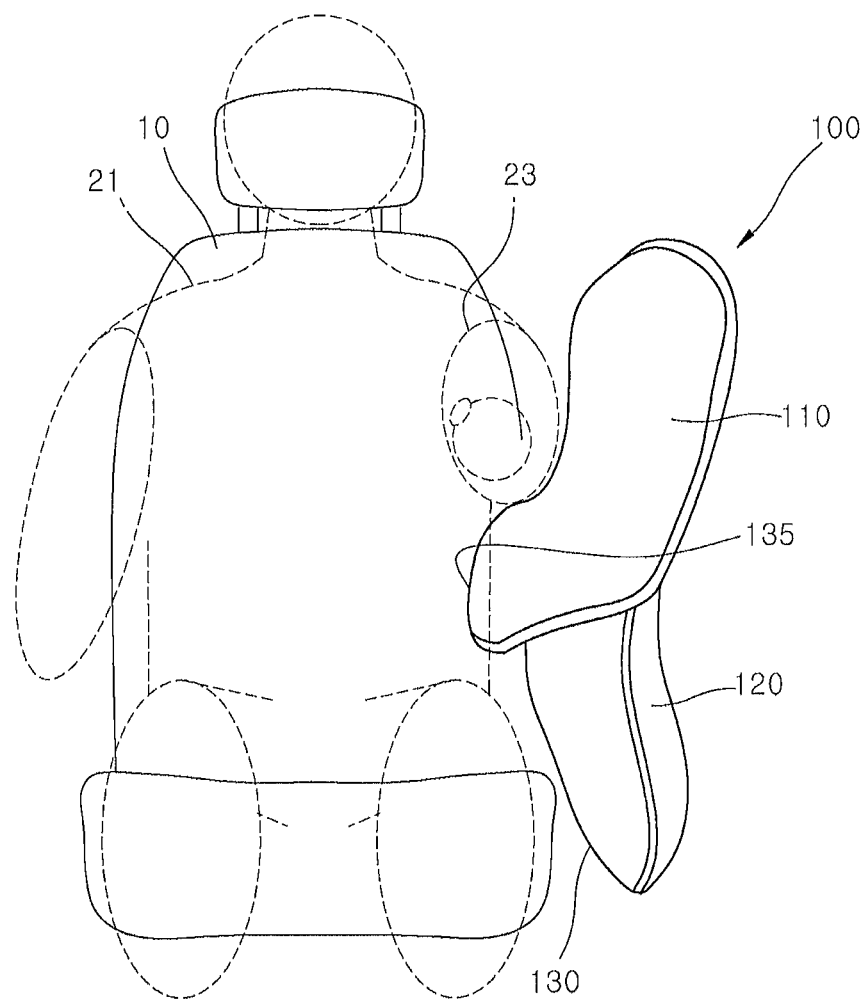
FIG. 11 is an operational diagram illustrating a state where the push chamber of the side airbag apparatus in accordance with the embodiment of the present invention pushes up an occupant's arm.

FIG. 9 is an operational diagram illustrating an initial state of deployment of the side airbag apparatus in accordance with the embodiment of the present invention, FIG. 10 is an operational diagram illustrating a state where the push chamber of the side airbag apparatus in accordance with the embodiment of the present invention is deployed, and FIG. 11 is an operational diagram illustrating a state where the push chamber of the side airbag apparatus in accordance with the embodiment of the present invention pushes up an occupant's arm.

Referring to FIGS. 9 to 11, when the vehicle is involved in a side collision, gas generated from an inflator is introduced into the shock absorbing chamber 110 formed by the outboard sheet part 120 and the inboard sheet part 130. As the shock absorbing chamber 110 is inflated, the push chamber 135 is unfolded and inflated.

The shock absorbing chamber 110 is deployed forwards from a side of the seat 10 so as to cover the outer side (outboard side) of the occupant's torso 21. Furthermore, the push chamber 135 is inflated and protruded from the shock absorbing chamber 110 to the interior side (inboard side).

Since the shock absorbing chamber 110 is deployed while being inflated forwards and the push chamber 135 is deployed to protrude to the interior side, the push chamber 135 pushes up the rear side of the arm 23. Since the arm 23 is rotated upwards by the inflation pressure of the push chamber 135, a space for allowing the shock absorbing chamber 110 to be inflated is provided between the torso 21 and the side portion of the vehicle body.

As the shock absorbing chamber 110 is completely inflated, the torso 21 and the arm 23 are pressed to the interior side. Since the push chamber 135 pushes up the arm 23 and then supports it, the arm 23 is rotated to the interior side if the inflation pressure of the shock absorbing chamber 110 acts on the arm 23. In this case, since a space corresponding to the thickness of the arm 23 is increased on a side of the torso 21, the inflation pressure of the shock absorbing chamber 110 acting on the torso 21 is relatively reduced. Therefore, it is possible to prevent the occupant's chest from being injured by the inflation pressure of the shock absorbing chamber 110.

In accordance with the present invention, since a push chamber pushes up an occupant's arm when the push chamber is inflated, a space is increased on a side of the occupant by the thickness of the arm. Therefore, a sufficient space is provided outside an occupant's torso to allow a shock absorbing chamber to be inflated in a thickness direction, thus relatively reducing the inflation pressure of the shock absorbing chamber that acts on an occupant's chest. Moreover, it is possible to prevent the occupant's chest from being injured by the inflation pressure of the shock absorbing chamber.

Furthermore, according to the present invention, since the arm is pushed up forwards by the push chamber, a space is sufficiently provided on a side of the occupant to allow the shock absorbing chamber to be deployed. Therefore, the shock absorbing chamber may be stably deployed on a side of the occupant without being interfered by the arm.

Although preferred embodiments of the invention have been disclosed for illustrative purposes, those skilled in the art will appreciate that various modifications, additions and substitutions are possible, without departing from the scope and spirit of the invention as defined in the accompanying claims.

Therefore, the spirit and scope of the present invention should be defined by the accompanying claims.

What is claimed is:

1. A side airbag apparatus, comprising:
   an outboard sheet part disposed on a side portion of a vehicle body;
   an inboard sheet part laminated to an interior side of the outboard sheet part, and formed such that a first peripheral part located on an opposite side of a gas injecting part is longer than a second peripheral part located adjacent to the gas injecting part;
   a push chamber formed such that a folding length of the first peripheral part is longer than a folding length of the second peripheral part, the push chamber being inflated and protruded to the interior side as gas is injected;

a folding seam part seaming a folded part of the first peripheral part in a state where the push chamber is folded; and a peripheral seam part seaming a peripheral part of the outboard sheet part, a peripheral part of the inboard sheet part, and the first peripheral part of the push chamber all together, after the push chamber is seamed.

2. The side airbag apparatus of claim 1, wherein the push chamber is folded such that a side around the first peripheral part is wide and a side around the second peripheral part is narrow.

3. The side airbag apparatus of claim 2, wherein the push chamber is folded in a triangular shape.

4. The side airbag apparatus of claim 3, wherein the push chamber is disposed to face the gas injecting part.

5. A method of manufacturing a side airbag apparatus, comprising:

forming an inboard sheet part such that a length of a first peripheral part located on an opposite side of a gas injecting part is longer than a length of a second peripheral part located adjacent to the gas injecting part;

folding a push chamber such that a folding length of the first peripheral part is longer than a folding length of the second peripheral part;

seaming the folded first peripheral part of the push chamber to form a folding seam part;

laminating the inboard sheet part to the outboard sheet part, after the push chamber is seamed; and seaming, after the push chamber is seamed, a peripheral part of the outboard sheet part, a peripheral part of the inboard sheet part, and the first peripheral part of the push chamber all together to form a peripheral seam part.

6. The method of claim 5, wherein the push chamber is folded such that a side around the first peripheral part is wide and a side around the second peripheral part is narrow.

7. The method of claim 6, wherein the push chamber is folded in a triangular shape.

8. The method of claim 5, wherein the push chamber is disposed to face the gas injecting part.

* * * * *